(12) United States Patent
Lin et al.

(10) Patent No.: US 7,726,752 B2
(45) Date of Patent: Jun. 1, 2010

(54) COMPUTER ENCLOSURE

(75) Inventors: Yu-Hsu Lin, San Jose, CA (US); Ke-You Hu, Shenzhen (CN); Jian-Rong Zheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 644 days.

(21) Appl. No.: 11/309,793

(22) Filed: Sep. 28, 2006

(65) Prior Publication Data

US 2007/0127221 A1   Jun. 7, 2007

(30) Foreign Application Priority Data

Dec. 5, 2005   (CN) .................. 2005 1 0102094

(51) Int. Cl.
*A47B 97/00*   (2006.01)

(52) U.S. Cl. .................. 312/223.2; 312/236

(58) Field of Classification Search ........... 312/257.1, 312/223.2, 236, 210, 213, 223.1, 319.5, 331; 454/224, 221, 222, 184, 277, 333; 137/601.09, 137/601.08; 49/82.1, 87.1, 74.1; 361/679.49, 361/679.5, 679.51, 690, 691, 692, 693, 694, 361/695
See application file for complete search history.

(56) References Cited

U.S. PATENT DOCUMENTS

| | | | | |
|---|---|---|---|---|
| 361,019 A | * | 4/1887 | Morstatt | 49/82.1 |
| 486,220 A | * | 11/1892 | Shure | 49/82.1 |
| 546,845 A | * | 9/1895 | Fuller | 49/87.1 |
| 595,854 A | * | 12/1897 | Lansing | 49/82.1 |
| 596,709 A | * | 1/1898 | Jungkurth | 454/313 |
| 978,718 A | * | 12/1910 | Ellington | 126/319 |
| 1,199,664 A | * | 9/1916 | Chambley | 454/275 |
| 2,117,529 A | * | 5/1938 | Wile et al. | 236/1 C |
| 2,545,874 A | * | 3/1951 | Brothers | 49/82.1 |
| 2,580,797 A | * | 1/1952 | Koch | 454/350 |
| 2,758,834 A | * | 8/1956 | Sanford et al. | 49/82.1 |
| 2,778,630 A | * | 1/1957 | Pearson | 49/82.1 |
| 2,800,322 A | * | 7/1957 | Tracy | 49/82.1 |
| 2,806,689 A | * | 9/1957 | Miller | 49/82.1 |

(Continued)

FOREIGN PATENT DOCUMENTS

CN   2529293 Y   1/2003

(Continued)

*Primary Examiner*—James O Hansen
(74) *Attorney, Agent, or Firm*—Wei Te Chung

(57) ABSTRACT

An exemplary computer enclosure includes a chassis, a pair of fixing members, a plurality of slats, and an actuating member. The chassis includes a pair of first parallel panels, and a second panel perpendicular to the first panels. The first panels and second panel cooperatively define an opening therebetween. The fixing members are attached to the first panels. The slats are pivotably attached to the first panels to adjustably shield the opening. Each of the slats includes a gear shaft fixed to an end thereof. The actuating member includes a rack bar slidably attached to one of the first panels to mesh with the gears shafts. The slats are rotatable clockwise or anticlockwise. Thus, the opening may be adjustably exposed to control an amount of air entering the chassis for dissipation of heat.

7 Claims, 7 Drawing Sheets

U.S. PATENT DOCUMENTS

| | | | | |
|---|---|---|---|---|
| 2,821,381 | A * | 1/1958 | Martin | 49/82.1 |
| 2,857,634 | A * | 10/1958 | Garbade et al. | 49/77.1 |
| 3,034,531 | A * | 5/1962 | Kennedy | 137/601.04 |
| 3,232,205 | A * | 2/1966 | Bumstead | 454/260 |
| 3,275,031 | A * | 9/1966 | Alyea et al. | 137/601.06 |
| 3,496,675 | A * | 2/1970 | Shellman, Sr. et al. | 49/63 |
| 3,537,331 | A * | 11/1970 | Rifkin | 74/528 |
| 3,746,042 | A * | 7/1973 | Finkel | 137/601.06 |
| 3,758,988 | A * | 9/1973 | Tachikawa | 49/82.1 |
| 3,834,078 | A * | 9/1974 | Beaumont | 49/82.1 |
| 3,847,210 | A * | 11/1974 | Wells | 165/103 |
| 3,996,952 | A * | 12/1976 | Root | 137/77 |
| 4,184,288 | A * | 1/1980 | Magill et al. | 49/7 |
| RE30,204 | E * | 2/1980 | Root | 137/77 |
| 4,275,762 | A * | 6/1981 | Field | 137/601.11 |
| 4,469,018 | A * | 9/1984 | Taulman | 454/276 |
| 4,506,825 | A * | 3/1985 | Grant | 236/9 A |
| 4,506,829 | A * | 3/1985 | Grant | 236/49.3 |
| 4,850,138 | A * | 7/1989 | Watanabe et al. | 49/82.1 |
| 5,216,837 | A * | 6/1993 | Cleaver et al. | 49/82.1 |
| 5,379,551 | A * | 1/1995 | Swapp | 49/82.1 |
| 5,469,658 | A * | 11/1995 | Digianni et al. | 49/82.1 |
| 5,580,307 | A * | 12/1996 | Arosio et al. | 454/336 |
| 5,588,911 | A * | 12/1996 | Gomez | 454/290 |
| 5,669,179 | A * | 9/1997 | Hanlon | 49/64 |
| 5,927,386 | A * | 7/1999 | Lin | 165/80.3 |
| 6,005,770 | A * | 12/1999 | Schmitt | 361/695 |
| 6,021,042 | A * | 2/2000 | Anderson et al. | 361/695 |
| 6,059,006 | A * | 5/2000 | Rossini | 160/107 |
| 6,094,864 | A * | 8/2000 | Hsu | 49/82.1 |
| 6,099,405 | A * | 8/2000 | Cunningham, Jr. | 454/228 |
| 6,145,251 | A * | 11/2000 | Ricci | 49/82.1 |
| 6,293,306 | B1 * | 9/2001 | Brenes | 137/601.09 |
| 6,392,874 | B1 * | 5/2002 | Gan | 361/679.59 |
| 6,468,054 | B1 * | 10/2002 | Anthony et al. | 417/360 |
| 6,590,848 | B1 * | 7/2003 | Chen | 720/654 |
| 6,736,719 | B1 * | 5/2004 | Gehring et al. | 454/155 |
| 6,932,447 | B2 | 8/2005 | Chen et al. | |
| 7,031,154 | B2 * | 4/2006 | Bash et al. | 361/690 |
| 7,056,203 | B2 * | 6/2006 | Shibata et al. | 454/155 |
| 7,097,557 | B2 * | 8/2006 | Kutschman | 454/276 |
| 2003/0133266 | A1 * | 7/2003 | Behl et al. | 361/695 |
| 2003/0136053 | A1 * | 7/2003 | Norbert | 49/74.1 |
| 2004/0045220 | A1 * | 3/2004 | Fraser et al. | 49/74.1 |
| 2004/0203334 | A1 * | 10/2004 | Shibata et al. | 454/155 |
| 2006/0285291 | A1 * | 12/2006 | Elkins | 361/695 |

FOREIGN PATENT DOCUMENTS

CN          2554034 Y      6/2003

\* cited by examiner

COMPUTER ENCLOSURE

FIELD OF THE INVENTION

The present invention relates to computer enclosures, and more particularly to a computer enclosure with good heat dissipating performance.

DESCRIPTION OF RELATED ART

A typical contemporary personal computer enclosure accommodates a number of electronic devices therein. The enclosure may need to be opened on a number of occasions for a variety of reasons, such as for replacing a defective electronic device. Therefore, the enclosure should be able to be readily opened and subsequently reassembled.

A conventional computer enclosure includes a base, side panels, and a top panel. The side panels and the top panel are respectively secured to the base of the enclosure with separate securing elements. A plurality of locking slots is defined in the base. A plurality of locking tabs is formed on the side panels and the top panel, for engagement into the locking slots of the base. Screws are then used to secure the side panels and the top panel to the base.

The side panels are fixedly attached to the base of the enclosure. Heat dissipation therein depends mainly on fans, pipes, or heat sinks installed in a limited inner space thereof.

What is needed is to provide a computer enclosure with good heat dissipating performance.

SUMMARY OF THE INVENTION

An exemplary computer enclosure includes a chassis, a pair of fixing members, a plurality of slats, and an actuating member. The chassis includes a pair of first parallel panels, and a second panel perpendicular to the first panels. The first panels and second panel cooperatively define an opening therebetween. The fixing members are attached to the first panels. The slats are pivotably attached to the first panels to changeably shield the opening. Each of the slats includes a gear shaft fixed to an end thereof. The actuating member includes a rack bar slidably attached to one of the first panels to mesh with the gears shafts. The slats are rotatable clockwise and anticlockwise. Thus, the opening is adjustable for controlling an amount of air entering the chassis for heat dissipation.

Other advantages and novel features of the invention will become more apparent from the following detailed description when taken in conjunction with the accompanying drawings.

DETAILED DESCRIPTION OF THE INVENTION

Figure 1:
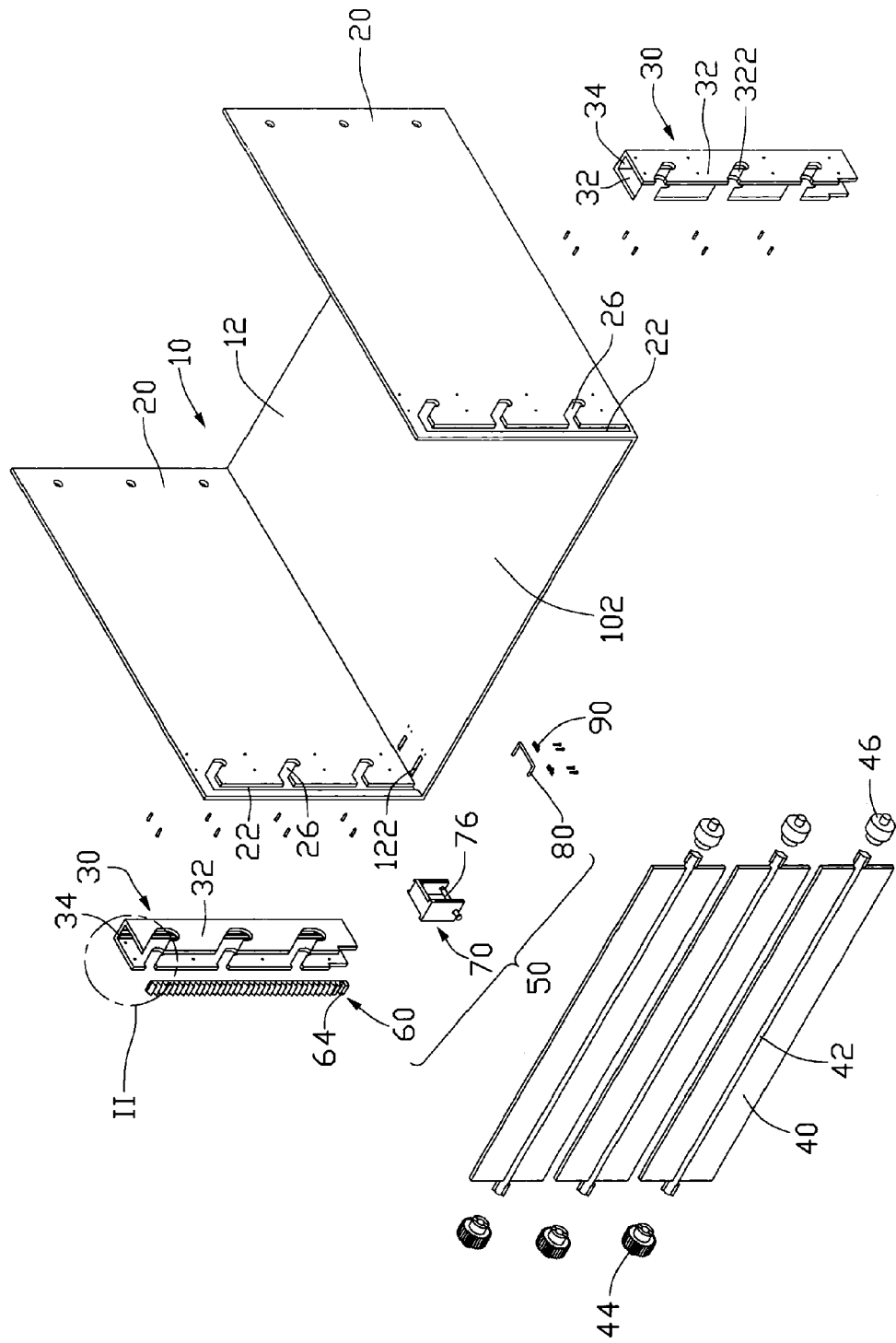
FIG. 1 is an exploded, isometric view of a computer enclosure in accordance with a preferred embodiment of the present invention, the computer enclosure including a computer chassis, a plurality of slats, and a handle member.

Referring to FIG. 1, a computer enclosure in accordance with a preferred embodiment of the present invention has a shutter blind structure, convenient for control of heat dissipation. The computer enclosure includes a chassis 10, a pair of fixing members 30, a plurality of slats 40, and an actuating member 50. The chassis 10 includes a pair of parallel first panels 20, a second panel 12 perpendicularly disposed between the first panels 20. The first panels 20 and the second panel 12 cooperatively define an opening 102 therebetween. The slats 40 adjustably cover the opening 102.

Each of the first panels 20 includes a channel 22 vertically defined in a front portion thereof, a plurality of first notches 26 slantingly defined therein beside the channel 22 and communicating with the channel 22 via a plurality of straight notches perpendicular to the channel 22. The first notches 26 each have rounded end portions. The second panel 12 includes a pair of slots 122 defined in a front portion thereof.

Figure 2:
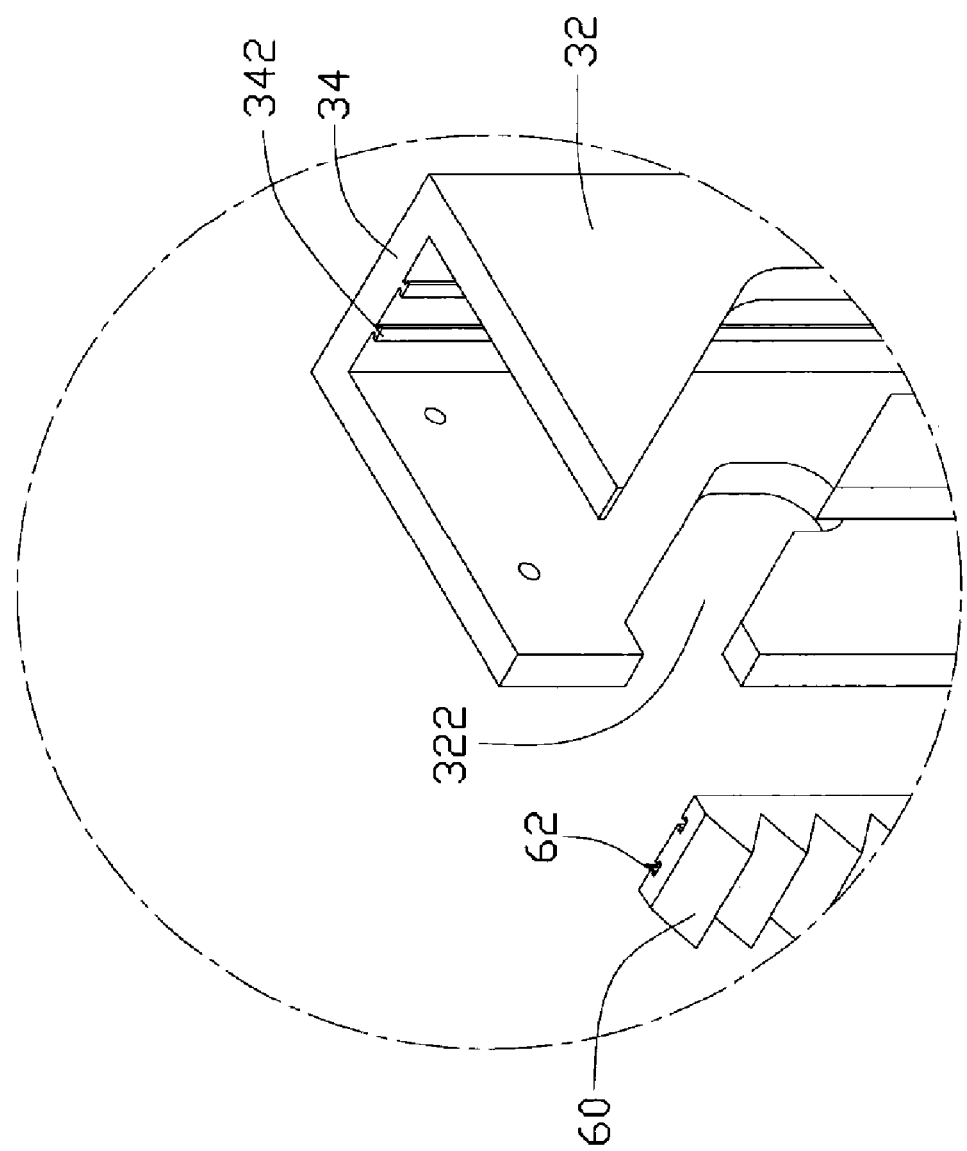
FIG. 2 is an enlarged view of a circled portion II of FIG. 1.

Referring also to FIG. 2, the fixing members 30 are attached to inside surfaces of the first panels 20, respectively. Each of the fixing members 30 includes a pair of parallel sidewalls 32, and a base wall 34 perpendicularly connecting the sidewalls 32. A plurality of second notches 322 is defined in the sidewalls 32, corresponding to the first notches 26 of the first panels 20. The second notches 322 each have rounded end portions. A pair of protruding bars 342 extends from an inside surface of the base wall 34 of a left one of the fixing members 30.

Each of the slats 40 includes a central axle 42 extending longitudinally therefrom, and a gear shaft 44 and a wheel shaft 46 attached to opposite ends of the center axle 42 respectively.

The actuating member 50 includes a rack bar 60 slidably attached to the left fixing member 30, a handle member 70, and a locating lever 80.

The rack bar 60 includes a pair of grooves 62 defined in a back portion thereof, and a locking block 64 formed at a bottom end thereof. The grooves 62 are for slidably engaging with the protruding bars 342 of the left fixing member 30.

Figure 3:
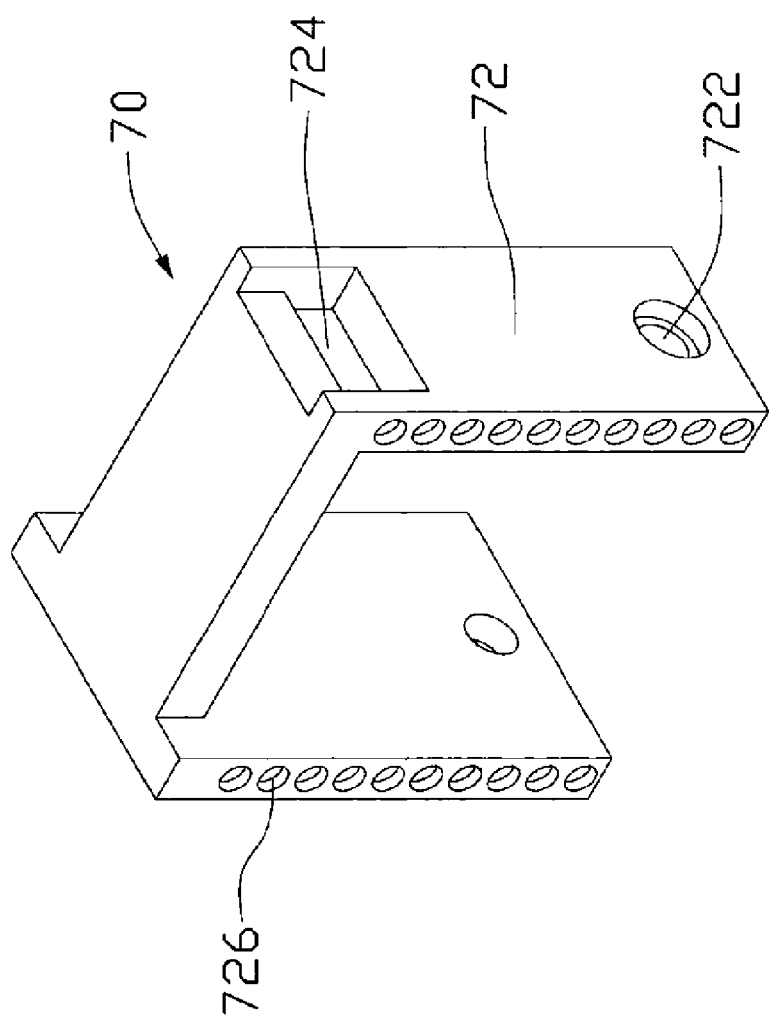
FIG. 3 is an enlarged view of the handle member of FIG. 1.

Referring also to FIG. 3, the handle member 70 includes a pair of parallel boards 72. A pair of through holes 722 is defined in the boards 72 respectively, for holding a handling pole 76 therein. A locking hole 724 is defined in one of the boards 72, for engaging with the locking block 64 of the rack bar 60. A plurality of pairs of locating holes 726 is defined in the boards 72, with axes in alignment with the boards 72.

The locating lever 80 is attached to an outside surface of the second panel 12, movably extending through a pair of bridged tabs 90 fixed on the second panel 12. The locating lever 80 has a U-shaped configuration, for selectively engaging in the corresponding pair of the locating holes 726 of the handle member 70.

Figure 4:
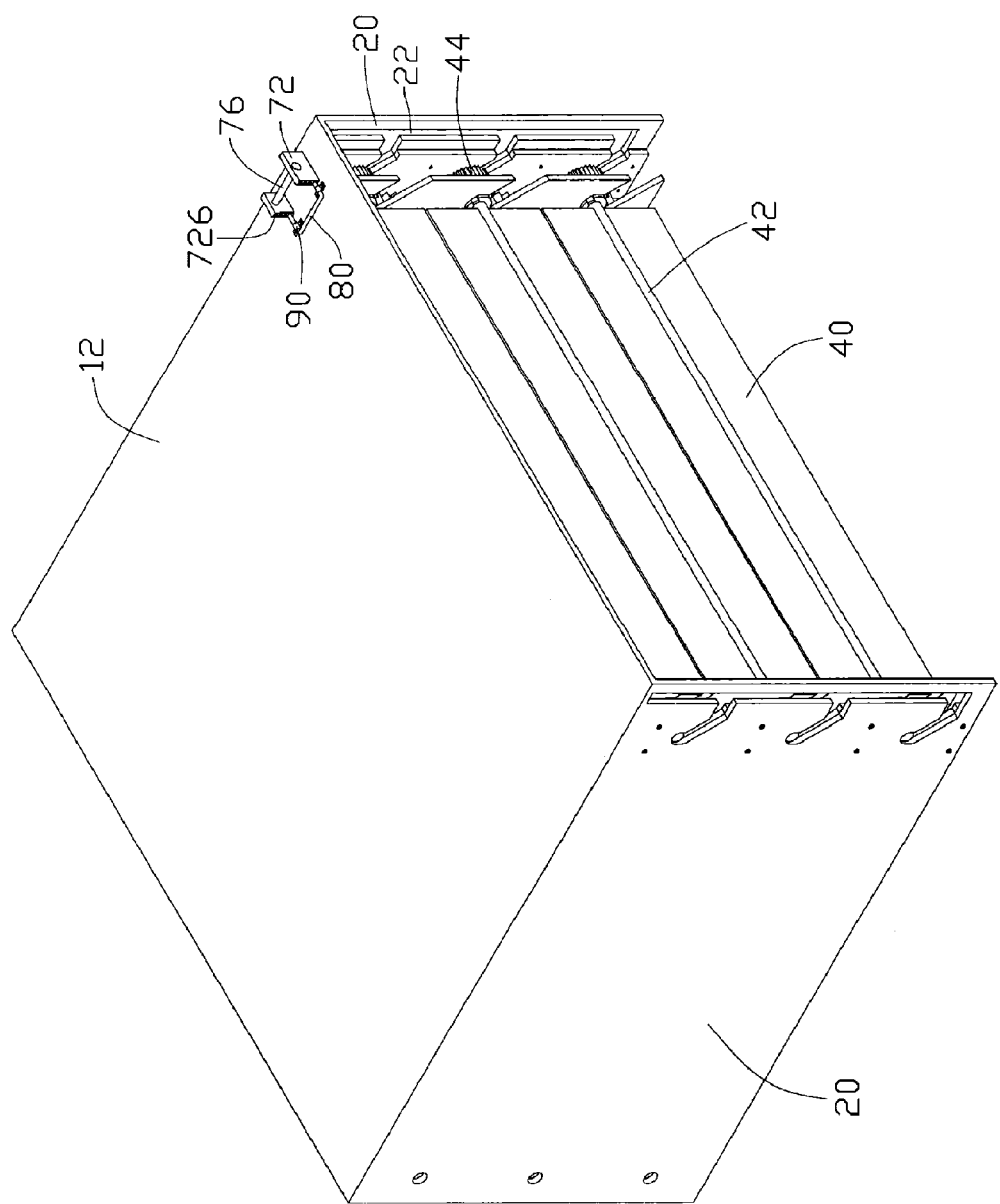
FIGS. 4 to 6 are assembled views of FIG. 1, showing the computer enclosure in different states.
Figure 5:
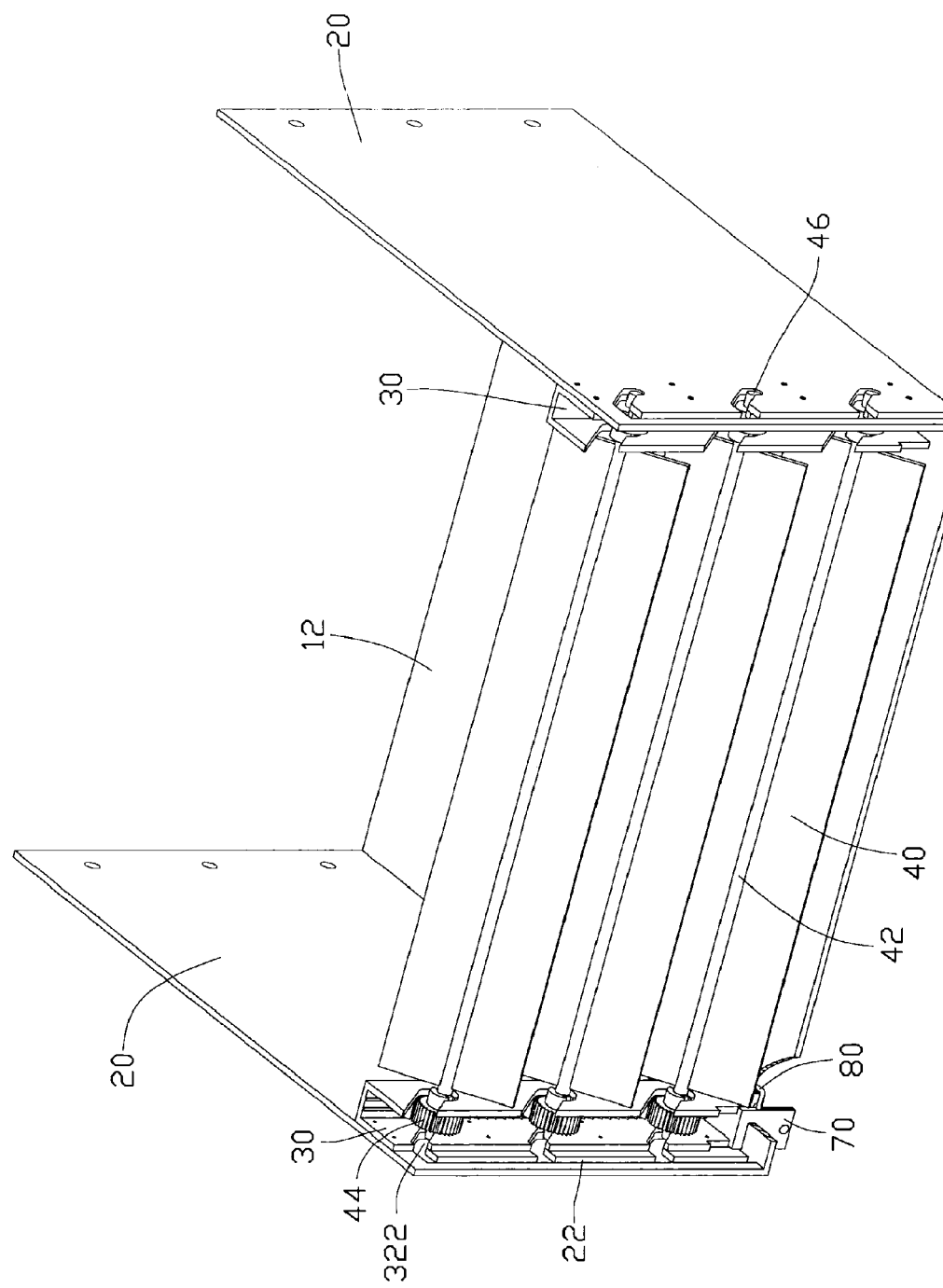
Figure 6:
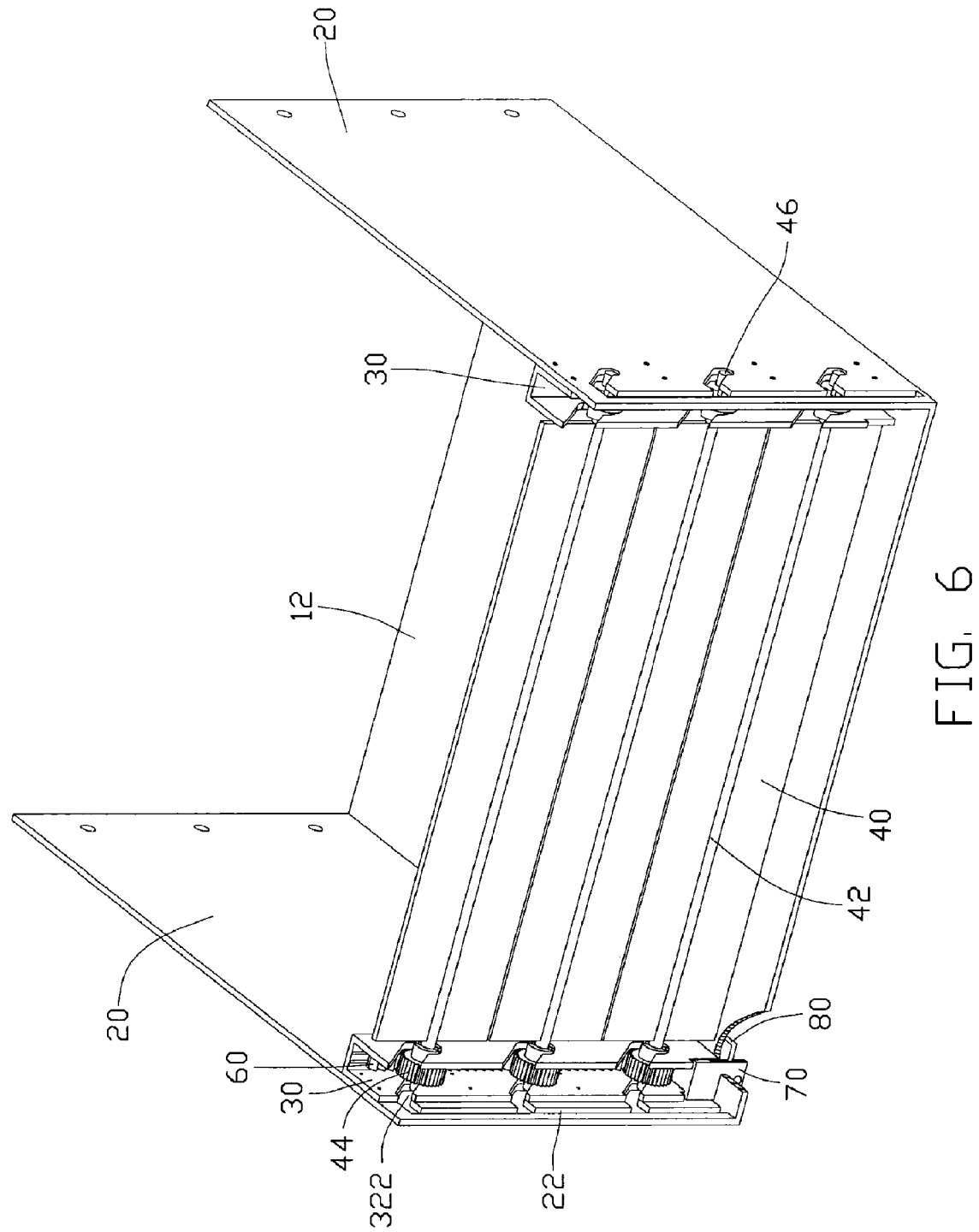

Referring also to FIGS. 4-6, in assembly, the fixing members 30 are attached to the first panels 20 by means of conventional fasteners, with the first notches 26 aligning with the second notches 322. The rack bar 60 is attached to the left fixing member 30, with the protruding bars 342 slidably engaging in the grooves 62. The handle member 70 is slidably attached to the second panel 12, with the pair of boards 72 thereof extending through the slots 122 of the second panel 12 and the locking hole 724 thereof engaging with the locking block 64 of the rack bar 60. The handling pole 76 extends through the through holes 722 of the handle member 70 to allow the boards 72 to be slidable relative to the second panel 12, for manual manipulation. The locating lever 80 movably extends into the bridging tabs 90 fixed to the outside surface of the second panel 12, in alignment with the locating holes 726 of the handle member 70. The slats 40 are pivotably attached to the fixing members 30, with the gear shafts 54 meshing with the rack bar 60. The gear shafts 54 are rotatably received between and in parallel with the sidewalls 32 of the left fixing member 30. Two ends of the gear shafts 44 are received in the first notches 26 of a left first panel 20 and the second notches 322 of the left fixing member 30. The wheel shafts 46 are rotatably received between and in parallel with the sidewalls 32 of a right fixing member 30. Two ends of the wheel shafts 46 are received in the first notches 26 of a right first panel 20 and the second notches 322 of the right fixing member 30.

In use, the locating lever 80 is drawn to disengage from the handle member 70. The rack bar 60 is moved upward and downward relative to the left fixing member 30, by manipulating the handling pole 76 of the handle member 70. The rack bar 60 meshes with the gear shafts 44 of the slats 40 so that the slats 40 rotate clockwise or anticlockwise. The opening 102 is gradually closed or opened, adjusting an amount of air admitted into the enclosure for dissipation of heat.

Figure 7:
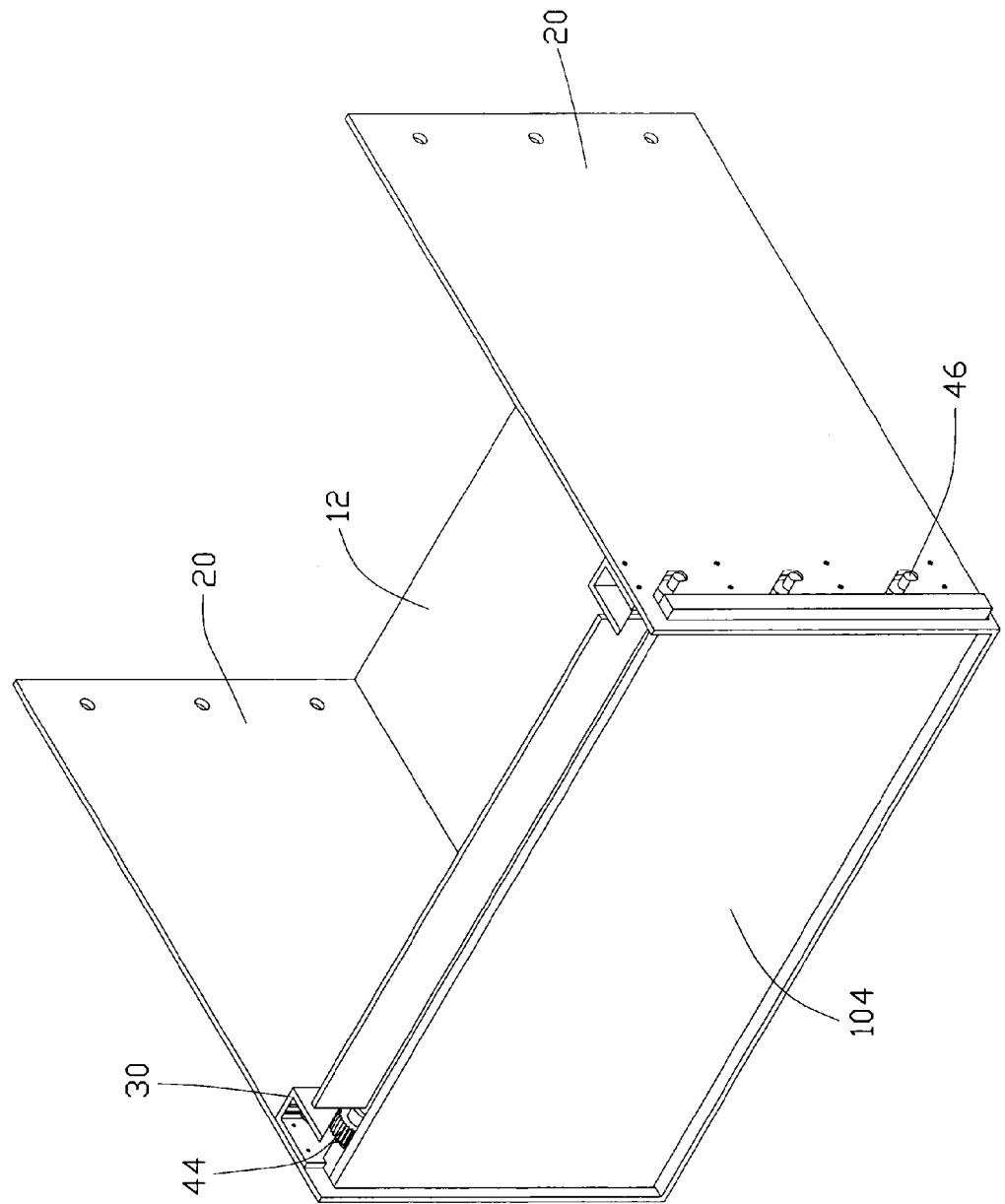
FIG. 7 is an assembled view of FIG. 1, together with a shielding plate attached to the computer chassis.

Referring also to FIG. 7, to gain access to the enclosure, all of the slats 40 are drawn out of the first notches 26 and second notches 322 and move into the channels 22 together. The slats 40 drop down and overlap on the second panel 12 so that the opening 102 of the chassis 10 is completely exposed, allowing convenient access to the computer enclosure. Before transporting and moving the computer enclosure, a shielding plate 104 is inserted into the channels 22 of the first panels 20 to cover the opening 102.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A computer enclosure comprising:
   a computer chassis defining an opening therein, a pair of slots being defined in the chassis;
   a plurality of slats pivotably attached to the chassis for changeably exposing the opening; and
   an actuating member slidably attached to the chassis, the actuating member controllable to drive the slats to pivot clockwise or anticlockwise;
   wherein each of the slats comprises a gear shaft, the actuating member comprises a rack bar meshing with the gear shafts of the slats, and a handle member attached to the rack bar; the handle member comprises a pair of boards slidably extending through the slots of the chassis to be positioned at an outside surface of the chassis, and a handling pole; the handling pole extends through the boards at the outside surface of the chassis to allow the boards to be slidable relative to the chassis;
   the chassis comprises a pair of first panels in a parallel alignment, and a second panel perpendicularly disposed between the first panels, the opening is defined between the first panel and second panels, and the slots are defined in the second panel;
   the computer enclosure further comprising a pair of fixing members attached to the first panels, wherein a pair of first notches is slantingly defined in the first panels, each of the fixing members comprises a base wall, and a pair of sidewalls extending from the base wall, a plurality of second notches is defined in the sidewalls, corresponding to the first notches, and the rack bar is slidably attached to the base wall of one of the fixing members; the computer enclosure further comprising a shielding plate, wherein each of the first panels comprises a channel connecting ends of the first notches, the shielding plate is inserted into the channels to cover the opening.

2. The computer enclosure as claimed in claim 1, wherein each of the slats comprises a wheel shaft fixed to an end opposite to the gear shaft thereof, the gear shafts and the wheel shafts are rotatably received in the first notches of the first panels and the second notches of the fixing members.

3. The computer enclosure as claimed in claim 1, wherein the actuating member further comprises a locating lever movably attached to the outside surface of the chassis, a plurality of locating holes is defined in side portions of the boards of the handle member, the locating lever selectively engages in the locating holes.

4. A computer enclosure comprising:
   a computer chassis comprising a pair of parallel first panels, and a second panel perpendicular to the first panels, an opening defined between the first and second panels;
   a plurality of slats pivotably attached to the first panels to adjustably cover the opening, each of the slats comprising a gear shaft attached to one end thereof;
   a rack bar meshing with the gear shafts so that the slats are rotatable clockwise or anticlockwise together; and
   a positioning member engaging with the rack bar in a manner so as to position the slats in a selective position;
   wherein a plurality of pairs of first notches is slantingly defined in the first panels, the computer enclosure further comprises a pair of fixing members attached to the first panels respectively; each of the fixing members comprises a base wall, and a pair of sidewalls extending from the base wall; a plurality of second notches is defined in the sidewalls in alignment with the first notches, the rack bar is slidably attached to the base wall of one of the fixing members, the gear shafts are received between and in parallel with the sidewalls of the fixing member and two ends thereof are rotatably received in the first notches of corresponding one of the first panels and the second notches of the fixing member.

5. The computer enclosure as claimed in claim 4, wherein each of the slats further comprises a central axle and a wheel shaft, each of the gear shafts is attached at an end of the central axle and each of the wheel shafts is fixed at another end thereof opposite to the gear shaft, the wheel shafts are received between the sidewalls of the other one of the fixing members in parallel and two ends thereof are rotatably received in the first notches of corresponding one of the first panels and the second notches of the fixing member.

6. The computer enclosure as claimed in claim 4, wherein the positioning member comprises a handle member attached to one end of the rack bar, and a locating lever, the handle member comprising a pair of boards in parallel alignment, the second panel of the chassis comprises a pair of slots defined therein for the boards of the handle member extending therethrough to be positioned at an outside surface of the second panel, the locating lever is movably attached to the outside surface of the second panel of the chassis, the boards define a plurality of pairs of locating holes therein, the locating lever selectively engages in the locating holes.

7. The computer enclosure as claimed in claim 4, further comprising a shielding plate, wherein each of the first panels comprises a channel connecting ends of the first notches, the shielding plate is inserted into the channels to cover the opening.

* * * * *